United States Patent [19]

Nakatomi et al.

[11] Patent Number: 4,475,381
[45] Date of Patent: Oct. 9, 1984

[54] METHOD AND APPARATUS FOR DETECTING PNEUMATIC PRESSURE IN AN INTERNAL COMBUSTION ENGINE

[75] Inventors: Takayoshi Nakatomi; Keiji Aoki, both of Susono, Japan

[73] Assignee: Toyota Jidosha Kogyo Kabushiki Kaisha, Toyota, Japan

[21] Appl. No.: 333,571

[22] Filed: Dec. 22, 1981

[30] Foreign Application Priority Data

Dec. 23, 1980 [JP] Japan .................. 55-181211

[51] Int. Cl.³ ........................... G01M 15/00
[52] U.S. Cl. ........................... 73/115
[58] Field of Search ........... 73/716, 116, 756, 115, 73/117.4, 736; 123/494

[56] References Cited

U.S. PATENT DOCUMENTS

| 3,645,141 | 2/1972 | Moore et al. | 73/756 |
| 4,165,650 | 8/1979 | Weissler | 73/115 X |
| 4,204,422 | 5/1980 | Inoue et al. | 73/756 |
| 4,377,145 | 3/1983 | Nagaishi | 73/116 X |

FOREIGN PATENT DOCUMENTS 123077 9/1979 Japan .................. 73/115

Primary Examiner—Jerry W. Myracle
Assistant Examiner—Brian R. Tumm
Attorney, Agent, or Firm—Cushman, Darby & Cushman

[57] ABSTRACT

The absolute intake manifold pneumatic pressure and the atmospheric pressure are selectively detected by a single absolute pneumatic pressure sensor, and the relative intake manifold pneumatic pressure is calculated from the detected values. The detection of the atmospheric pressure by the sensor is carried out only when the engine is operated under a predetermined operating condition.

8 Claims, 8 Drawing Figures

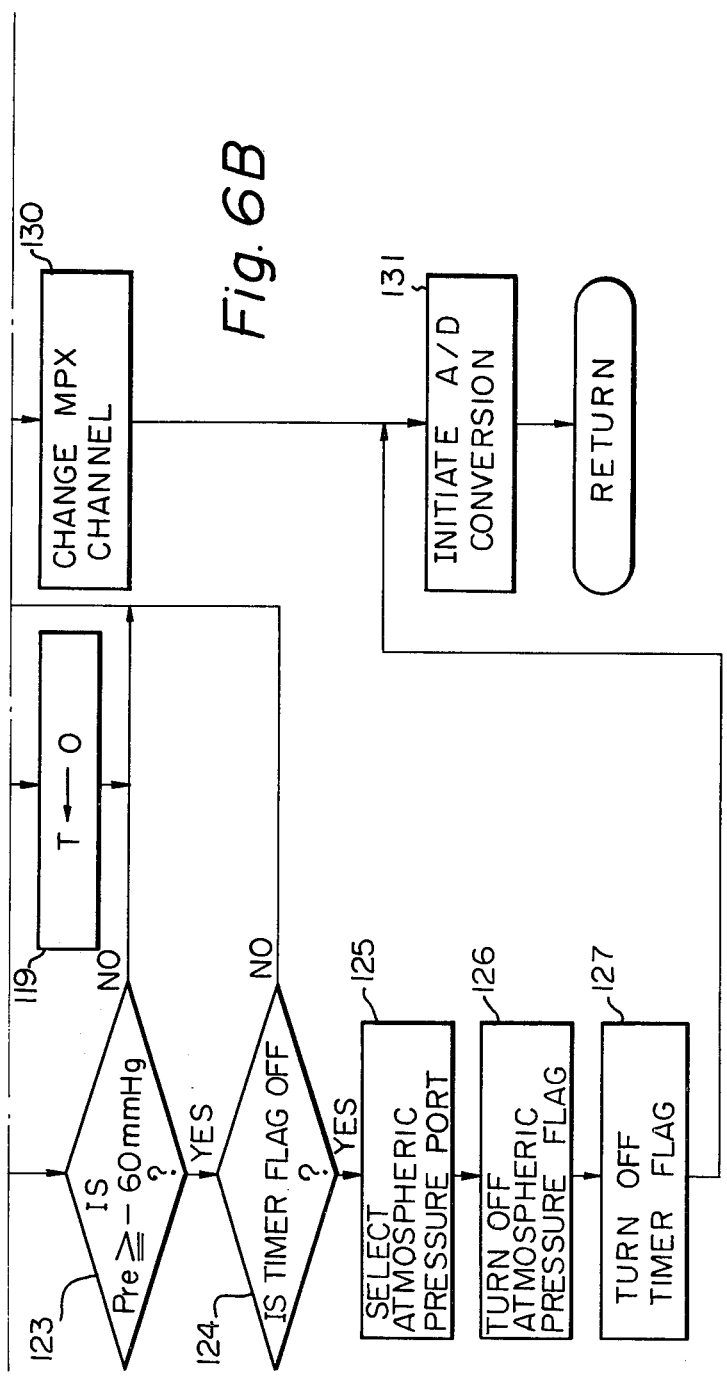

METHOD AND APPARATUS FOR DETECTING PNEUMATIC PRESSURE IN AN INTERNAL COMBUSTION ENGINE

BACKGROUND OF THE INVENTION

The present invention relates to a method and apparatus for detecting pneumatic pressure in the intake passage downstream of the throttle valve of an internal combustion engine.

In an internal combustion engine, the relative pneumatic pressure (negative pneumatic pressure) in the intake manifold must be detected in order to execute ignition timing control or exhaust gas recirculation (EGR) control (in the case of using an EGR value controlled by the atmospheric pressure and the negative pneumatic pressure in the intake manifold). For this purpose, the relative pneumatic pressure in the intake manifold is detected by a relative pneumatic pressure sensor. In the internal combustion engine of the fuel injection type in which the amount of fuel injection is controlled depending upon the running speed of the engine and the absolute pneumatic pressure in the intake manifold, however, it is an essential requirement that the absolute pneumatic pressure in the intake manifold be detected. The engine of this type, therefore, must be equipped with both a sensor for detecting relative pneumatic pressure in the intake manifold and a sensor for detecting absolute pneumatic pressure in the intake manifold. Otherwise, the engine must be provided with either one of the two types of sensors, and the detected value must be utilized for finding the other value. The former method makes it possible to maintain good control precision in the control operations but requires two sensors and, hence, necessitates increasing the manufacturing cost. According to the latter method, on the other hand, no compensation is effected when the atmospheric pressure is changed and, hence, control precision is greatly decreased. Consequently, it is difficult in the case of the latter method to cope with the stringent regulations placed on exhaust gases in recent years.

SUMMARY OF THE INVENTION

It is, therefore, an object of the present invention to provide a method and an apparatus for detecting pneumatic pressure in an internal combustion engine, whereby only a single absolute pneumatic pressure sensor need be employed without decreasing the control precision of the engine.

According to the present invention, a method for detecting pneumatic pressure in an internal combustion engine which has a single absolute pressure sensor for detecting the absolute pneumatic pressure of an applied fluid comprises the steps of: detecting the absolute pneumatic pressure in the intake passage downstream of the throttle valve and the atmospheric pressure by selectively communicating the absolute pressure sensor to a pressure detection port open to the intake passage downstream of the throttle valve or to the open air, the above detection of atmospheric pressure being executed only when the engine is operated under a predetermined operating condition; and calculating the relative pneumatic pressure in the intake passage downstream of the throttle valve from the detected absolute pneumatic pressure in the intake passage and from the atmospheric pressure.

Furthermore, according to the present invention, an apparatus for detecting pneumatic pressure in an internal combustion engine comprises: a single absolute pressure sensor for detecting the absolute pneumatic pressure of an applied fluid; means for selectively communicating the absolute pressure sensor to a pressure detection port open to the intake passage downstream of the throttle valve or to the open air so as to detect the absolute pneumatic pressure in the intake passage downstream of the throttle valve and the atmospheric pressure, the absolute pressure sensor communicating with the open air only when the engine is operated under a predetermined operating condition; and means for calculating the relative pneumatic pressure in the intake passage downstream of the throttle valve from the detected absolute pneumatic pressure in the intake passage and from the atmospheric pressure.

The above and other related objects and features of the present invention will be apparent from the description of the present invention set forth below, with reference to the accompanying drawings, as well as from the appended claims.

BRIEF DESCRIPTION OF THE DRAWINGS

FIGS. 5, 6A and 6B are flow diagrams illustrating parts of the control program for the control circuit shown in FIG. 4.

DETAILED DESCRIPTION OF THE PREFERRED EMBODIMENTS

Figure 1:
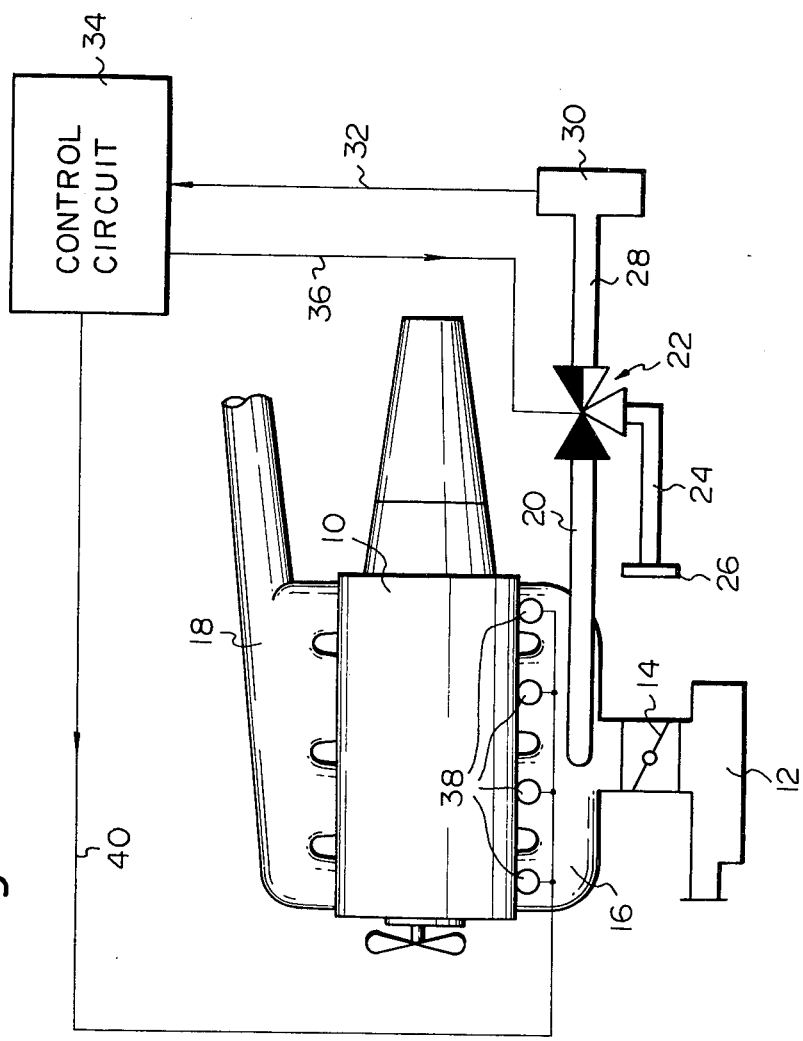
FIG. 1 is a schematic diagram illustrating an embodiment of the present invention.

Referring to FIG. 1, reference numeral 10 denotes an internal combustion engine, 12 denotes an air cleaner, 14 denotes a throttle valve, 16 denotes an intake manifold, and 18 denotes an exhaust manifold. The intake manifold 16 is communicated with a port of a three-way electromagnetic switching valve 22 via a conduit 20. Another port of the switching valve 22 is open to the open air through a conduit 24 and an air filter 26. A further port of the switching valve 22 is communicated with a single absolute pressure sensor 30 via a conduit 28. The output signal of the absolute pressure sensor 30 is fed to a control circuit 34 via a line 32. Responsive to the drive signals sent from the control circuit 34 via a line 36, the switching valve 22 selectively communicates the conduit 28 with the conduit 20 or with the conduit 24. In other words, the switching valve 22 selectively applied the pneumatic pressure in the intake manifold 16 or the atmospheric pressure to the absolute pressure sensor 30 responsive to the drive signals from the control circuit 34.

The intake manifold 16 is provided with a plurality of fuel injection valves (or often a single fuel injection valve) 38 which inject the compressed fuel from the fuel supply system (not shown) into the engine responsive to injection signals sent from the control circuit 34 via a line 40.

Figure 2:
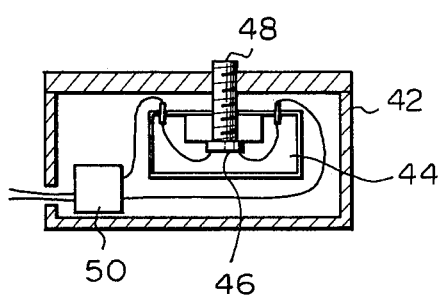
FIGS. 2 and 3 are sectional diagrams illustrating examples of the absolute pressure sensors shown in FIG. 1, respectively.

The absolute pressure sensor 30 detects the absolute pneumatic pressure of the gas applied thereto and generates signals of a power or a current that corresponds to the detected absolute pneumatic pressure. FIG. 2 illustrates one example of the absolute pressure sensor consisting of a semiconductor. In FIG. 2, reference numeral 42 denotes a housing, 44 denotes a sealed chamber of which the internal side is maintained as a vacuum, 46 denotes a semiconductor chip disposed in the sealed chamber, 48 denotes a conduit which is mounted so that one end comes into intimate contact with one surface of the semiconductor chip 46, and 50 denotes an electric circuit. The conduit 48 receives the pneumatic pressure to be detected, and the pneumatic pressure in the conduit 48 acts upon one surface of the semiconductor chip 46. The semiconductor chip 46 will have a plurality of resistance layers that are connected in a bridgelike fashion on the surface of a silicon chip. The semiconductor chip 46 is distorted when the pneumatic pressure is exerted on the surface thereof, and resistances of the resistance layers undergo variation depending upon the degree of distortion. By converting the change in the resistances through the bridge circuit and the above-mentioned circuit 50, it is possible to obtain signals having a voltage value or a current value that corresponds to the applied pneumatic pressure. Further, since the other side of the semiconductor chip 46 is maintained as a vacuum, the signals possess a value that corresponds to the absolute pneumatic pressure.

Figure 3:
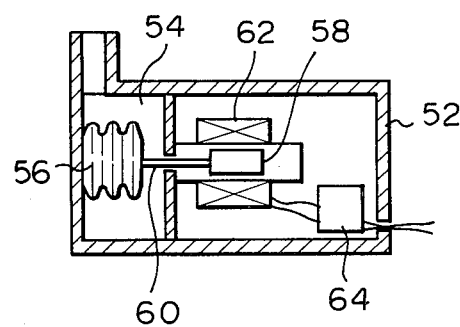

FIG. 3 illustrates another example of the absolute pressure sensor of the bellows type (Gulton type), in which reference numeral 52 denotes a housing, 54 denotes a pressure chamber which receives the pneumatic pressure to be detected, 56 denotes a vacuum bellows installed in the pressure chamber 54, 58 denotes a moving core coupled to an end of the bellows 56 via a rod 60, 62 denotes a differential transformer disposed around the core 58, and 64 denotes an electric circuit. The vacuum bellows 56 expands and contracts depending upon the pneumatic pressure in the pressure chamber 54, and the core 58 moves in the axial direction. The differential transformer 62 is provided with an exciting coil that is served with an a-c current of a predetermined frequency and a detection coil for removing, in the form of electric signals, the a-c magnetic flux that changes depending upon the position of the core 58. By converting the detected signals through the circuit 64, it is possible to obtain signals having a voltage value or a current value that corresponds to the absolute pneumatic pressure.

Figure 4:
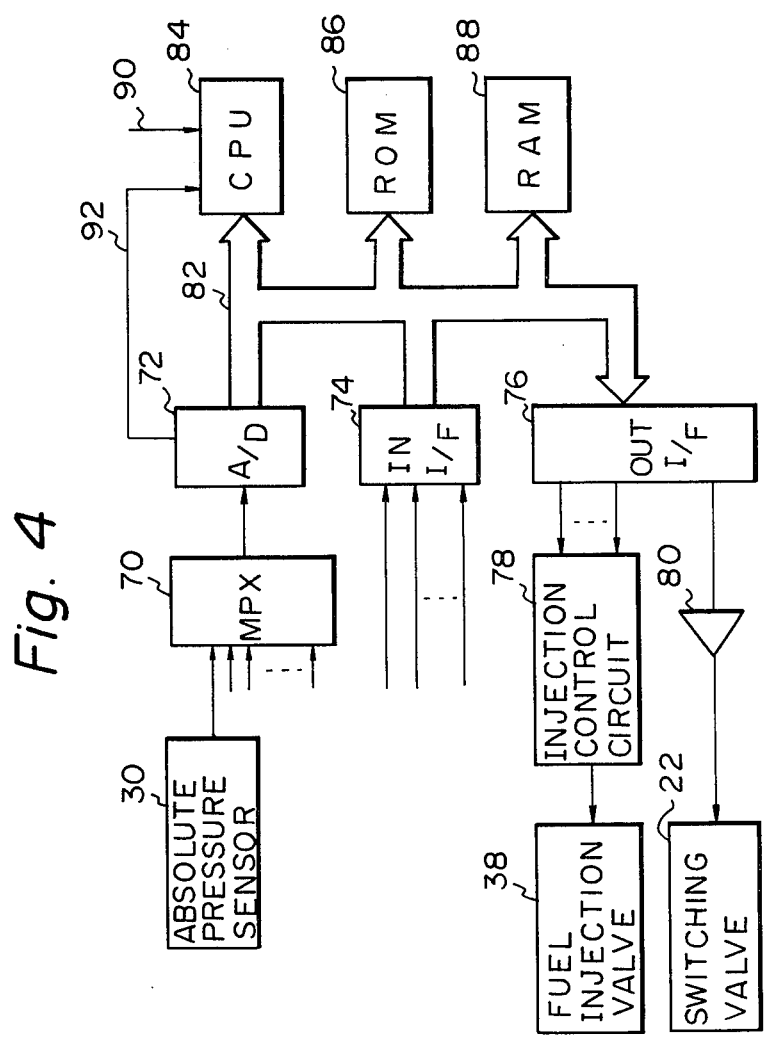
FIG. 4 is a block diagram illustrating the control circuit shown in FIG. 1.

FIG. 4 is a block diagram which schematically illustrates the control circuit 34 of FIG. 1. As will be obvious from FIG. 4, the control circuit 34 chiefly consists of a programed digital computer (microcomputer).

The output terminals of the absolute pressure sensor 30 have been connected to the input terminals of a predetermined channel of an analog multiplexer 70. Input terminals of other channels of the multiplexer 70 receive signals of various sensors (not shown) that generate analog detection signals. The multiplexer 70 selects the channels responsive to the instructions from a central processing unit (CPU) 84, described later, and sends the signals of the selected channel to an analog-to-digital converter (A/D converter) 72 which converts the input signals into digital signals according to the instructions for initiating A/D conversion sent from the CPU 84. An input interface 74 receives signals from the sensors that generate digital detection outputs. A fuel injection control circuit 78 and a drive circuit 80 are connected to an output interface 76. The output data related to the fuel injection time sent from the CPU 84 is converted into injection signals through the fuel injection control circuit 78 and is applied to the fuel injection valves 38. Further, the output data related to changing the port of the switching valve 22 is amplified through the drive circuit 80 to form drive signals that will be sent to the switching valve 22.

The A/D converter 72, input interface 74, and output interface 76 are connected to the CPU 84, to a read-only memory (ROM) 86 and to a random access memory (RAM) 88 via a data bus 82. The ROM 86 stores a program for controlling the digital computer as well as the data used for performing the calculation.

Figure 5:
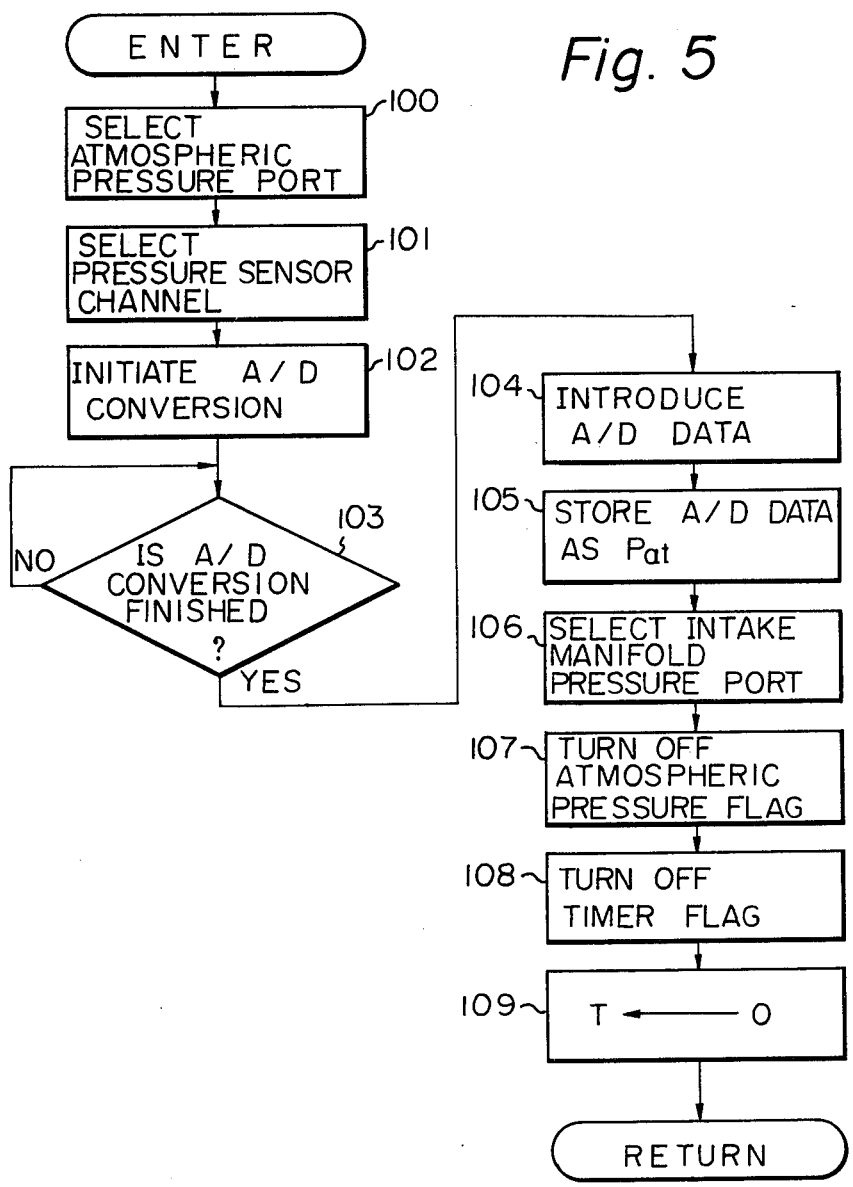
Figure 6A:
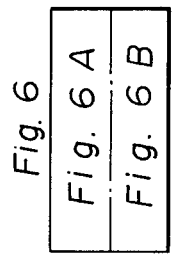
Figure 6A:
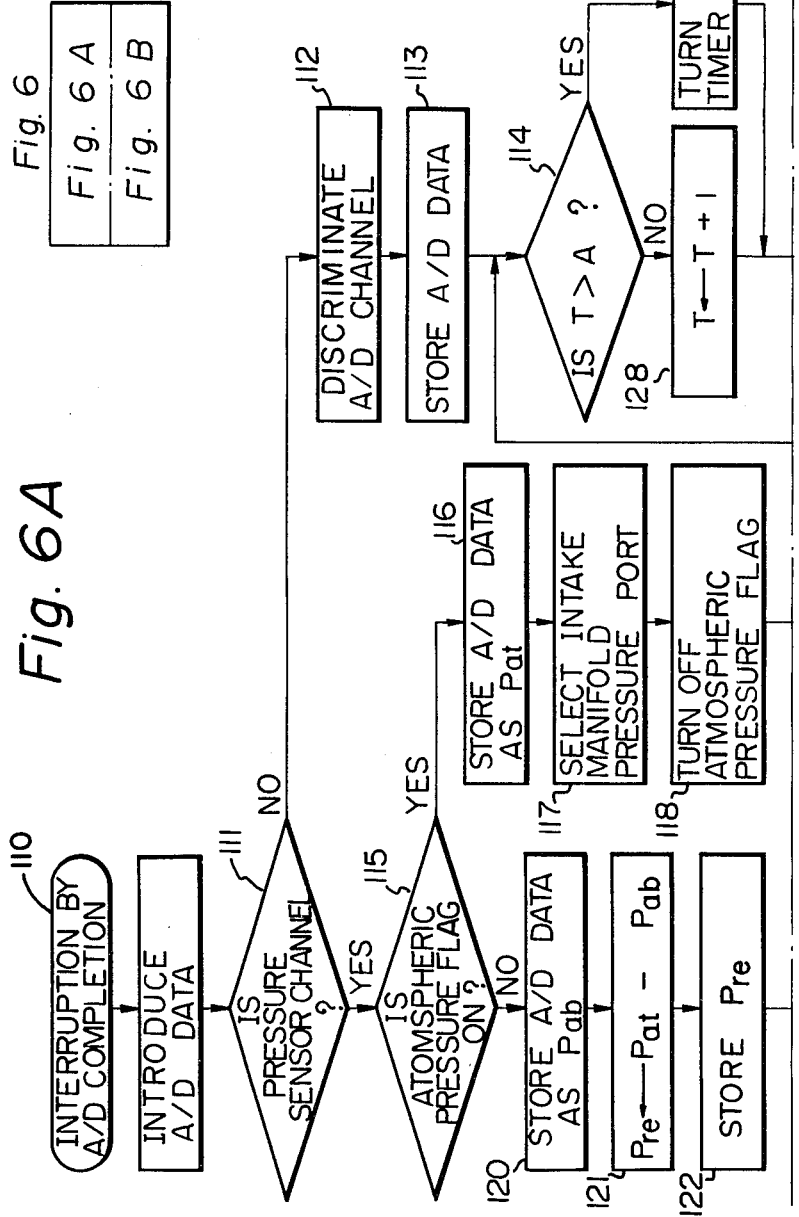

FIGS. 5, 6A and 6B are flow diagrams illustrating parts of the above-mentioned control program. Opration of the embodiment of the present invention will be described below in conjunction with FIGS. 5, 6A and 6B.

When the ignition switch (not shown) of the engine is turned on, an initializing signal is applied to the CPU 84 via a line 90; the CPU 84 executes the initial routine which is shown in FIG. 5. First, at a point 100, the CPU 84 instructs to select the atmospheric pressure port in order to switch the switching valve 22 toward the side of the open air. This instruction is performed by producing, for example, an output "1" to a predetermined bit position of the output interface 76. Therefore, the switching valve 22 is energized so that atmospheric pressure is applied to the pressure sensor 30. At a point 101, the CPU 84 instructs the multiplexer 70 so as to effect selection of the channel that corresponds to the pressure sensor 30. Then, at a point 102, the CPU 84 instructs the A/D converter 72 to initiate A/D conversion of output signals produced by the pressure sensor 30. At a point 103, the CPU 84 repetitively discriminates whether A/D conversion is finished or not until A/D conversion is completed. When the notice of completion of A/D conversion is sent to the CPU 84 via a line 92, the program proceeds to a point 104 where the data after it was A/D converted is introduced. Then, at a point 105, the thus introduced data is stored as the data Pat of atmospheric pressure in a predetermined area of the RAM 88. Then at a point 106, the CPU 84 produces instructions to select the intake pressure port in order to change the switching valve 22 toward the side of intake pressure. This instruction is performed by setting "0" to the bit of the output interface 76 which is related to the instructions for selecting the atmospheric pressure port. Therefore, the switching valve 22 is de-energized, and the pneumatic pressure (intake manifold pressure) in the intake manifold 16 is applied to the pressure sensor 30. At the succeeding points 107, 108 and 109, the flag that will be used hereinafter and the timer are set to the initial conditions. That is, the atmospheric pressure flag and the time flag are turned off, and a counted value T, which is the content of the timer, is set to "0", i.e., O→T. Then the CPU 84 executes a variety of other processings required for the initial routine; the routine of FIG. 5 is completed.

According to the processing routine of FIG. 5 mentioned in the foregoing paragraph the data Pat of atmospheric pressure is detected when the power supply is turned on and the program is initialized, and the data is stored in the RAM 88.

When the engine is continuously operated thereafter, the CPU 84 executes the interrupt processing routine of FIGS. 6A and 6B after every completion of A/D conversion is reported from the A/D converter 72 via the line 92. Namely, the processing routine of FIGS. 6A and 6B is executed after every interrupt period that nearly corresponds to the time of A/D conversion. As the interrupt is generated, at a point 110, the CPU 84 introduces the data which has been subjected to A/D conversion. Then, at a point 111, the CPU 84 discriminates from the channel selected by the multiplexer 70 whether the data subjected to A/D conversion is the data from the pressure sensor 30 or not. When the channel is not related to the pressure sensor 30, the program proceeds to a point 112 where it is discriminated what data was subjected to A/D conversion. Then the A/D converted data is stored in the corresponding area of RAM 88 at a point 113. Thereafter, the program proceeds to a point 114. When it is discriminated at a point 111 that the channel is related to the pressure sensor 30, the program proceeds to a point 115 where the CPU 84 discriminates whether the atmospheric pressure flag is on or not. The atmospheric pressure flag is turned on when the atmospheric pressure port is selected and is turned off when the intake pressure port is selected. Therefore, when the atmospheric pressure flag is on, the input data (A/D data) indiates the detected atmospheric pressure. At a point 116, therefore, the detected data is stored as the atmospheric pressure data Pat in a predetermined area of the RAM 88. Then, at a point 117, the CPU 84 produces instructions to select the intake pressure port, at a point 118, turns the atmospheric pressure flag off, at a point 119, resets the content of the timer to zero, i.e., sets T←0, and thereafter the program proceeds to the point 114. When it is discriminated at the point 115 that the atmospheric pressure flag is off, the program proceeds to a point 120 where the input data (A/D data) is stored as the intake manifold pressure data Pab in a predetermined area of the RAM 88. Then, at a point 121, the CPU 84 calculates the difference Pre between the atmospheric pressure data Pat and the intake manifold pressure data Pab based upon a relation Pre=Pat−Pab. Since the pressure sensor 30 is the absolute pressure sensor as mentioned earlier, the intake pressure data Pab represents the absolute pneumatic pressure in the intake manifold, and the calculated result Pre represents the relative pneumatic pressure in the intake manifold. At a point 122, the thus calculated data Pre of the relative intake manifold pressure is stored in a predetermined area of the RAM 88.

At a point 123, the CPU 84 discriminates whether the data Pre of the relative intake manifold pressure stored in the RAM 88 is on the side of the atmospheric pressure compared to a predetermined pressure value, for example, compared to a value that corresponds to −60 mmHg. When Pre≧−60 mmHg, i.e., when the data Pre is on the side of the atmospheric pressure, the program proceeds to a point 124 where it is discriminated whether the timer flag is on or not. The program proceeds to points 125 through 127 only when the relative intake manifold pressure is on the side of atmospheric pressure compared to −60 mmHg and only when the timer flag is on. In other cases, the program proceeds to the point 114.

At the point 114, the CPU 84 discriminates whether a counted value T, which is the content of the timer, is greater than a predetermined value A. When T≦A, the program proceeds to a point 128 where to value T is increased by one. Regarding T≦A, the program necessarily passes through the point 128 for every execution of the interrupt processing routine of FIGS. 6A and 6B. Therefore, the counted value T becomes greater than the predetermined value A after predetermined periods of time have passed. In this case, therefore, the program proceeds from the point 114 to a point 129 where the timer flag is turned on.

At a point 130, the channel of the multiplexer 70 is changed to the next channel which is different from that of the pressure sensor 30. At a point 131, the CPU 84 produces instructions to initiate A/D conversion of the data of the changed channel, whereby the interrupt processing routine is completed.

When the relative intake manifold pressure is on the side of the atmospheric pressure compared to −60 mmHg, and when the timer flag is on at the points 123 and 124 as mentioned above, processing of the points 125 through 127 is executed. When the relative intake manifold pressure is on the side of the atmospheric pressure compared to −60 mmHg, the operation conditions of the engine remain relatively stable, and the intake manifold pressure does not change suddenly. Under the above-mentioned condition in which the timer flag is on, the CPU 84 produces instructions to select the atmospheric pressure port at the point 125, turns the atmospheric pressure flag on at the point 126, turns the timer flag off at the point 127, and the program then proceeds to the point 131, where the CPU 84 produces instructions to initiate A/D conversion without changing the channel of the multiplexer 70. Namely, the data Pat of the atmospheric pressure is detected in the above-mentioned case. As mentioned above, the timer flag is turned on only when the counted value T is greater than the predetermined value A. Further, the counted value T becomes zero only when the atmospheric pressure data Pat is being detected. Therefore, the timer flag is turned on when a predetermined period of time has passed after since the atmospheric pressure data Pat of the previous time detected. In other words, the pressure sensor 30 usually detects the absolute pneumatic pressure in the intake manifold 16 and detects the atmospheric pressure only when the relative pneumatic pressure is more on the side of atmospheric pressure than on the side of the predetermined value and only after a predetermined period of time has passed since the atmospheric pressure was detected the previous time. The atmospheric pressure is detected after a period of time longer than the predetermined period of time, since the atmospheric pressure does not suddenly change, and it is desirable to detect the intake manifold pressure more frequently than to detect the atmospheric pressure.

Here, the value −60 mmHg at the point 123 of the processing routine of FIG. 6B may be changed to any value ranging, for example, from −10 mmHg to −60 mmHg.

According to the present invention as described in detail in the foregoing paragraphs, the absolute intake manifold pressure and the atmospheric pressure are selectively detected by the absolute pressure sensor, and the relative intake manifold pressure is calculated from the detected value. Therefore, the absolute intake manifold pressure and the relative intake manifold pressure can be detected by a single pressure sensor, and the engine can be controlled based upon these pressures while maintaining increased control precision, without causing the manufacturing cost to be increased. Further, since the atmospheric pressure is detected only when the engine is operated under a predetermined operating condition, the detection precision in the case of intake manifold pressure does not decrease and the control precision relying upon the intake manifold pressure does not decrease either. Furthermore, the absolute pressure sensor features increased precision for detecting the intake manifold pressure. If it is attempted to detect the relative pneumatic pressure using a relative pressure sensor, the detection precision tends to decrease. According to the present invention, however, the detection precision does not decrease, and, even in this sense, the present invention makes it possible to obtain detection values while maintaining high precision and to increase control precision.

As many widely different embodiments of the present invention may be constructed without departing from the spirit and scope of the present invention, it should be understood that the present invention is not limited to the specific embodiments described in this specification, except as defined in the appended claims.

We claim:

1. A method of detecting pneumatic pressure in an internal combustion engine having a single absolute pressure sensor for detecting the absolute pneumatic pressure of a fluid applied to the sensor, an intake passage, a throttle valve disposed on the intake passage, and a pressure detection port open to the intake passage at a position located downstream of the throttle valve, said method comprising the steps of:

detecting the absolute pneumatic pressure in the intake passage downstream of the throttle valve and the atmospheric pressure by selectively communicating said absolute pressure sensor to said pressure detection port of the intake passage or to the open air, said detection of the atmospheric pressure being executed only initially and when the engine is operated under a pedetermined operating condition, where the difference between the detected absolute pneumatic pressure and the detected atmospheric pressure is less than a predetermined value, after a predetermined period of time has elapsed since the previous detection of the atmospheric pressure and calculating the relative pneumatic pressure in the intake passage downstream of the throttle valve from said detected absolute pneumatic pressure in the intake passage and from said atmospheric pressure.

2. A method as claimed in claim 1, wherein said detection of the atmospheric pressure initially occurs when the engine is started.

3. A method of detecting pneumatic pressure in an internal combustion engine having a single absolute pressure sensor for detecting the absolute pneumatic pressure of a fluid applied to the sensor, an intake passage, a throttle valve disposed on the intake passage, and a pressure detection port open to the intake passage at a position located downstream of the throttle valve, said method comprising the steps of:

detecting the absolute pneumatic pressure in the intake passage downstream of the throttle valve and the atmospheric pressure by selectively communicating said absolute pressure sensor to said pressure detection port of the intake passage or to the open air;

storing said detected absolute pneumatic pressure in the intake passage and said detected atmospheric pressure;

discriminating, in response to the stored absolute pneumatic pressure and the stored atmospheric pressure, whether or not the engine is operated under a predetermined operating condition where the difference between the stored absolute pneumatic pressure and the stored atmospheric pressure is less than a predetermined value, in order to communicate said absolute pressure sensor to the open air so as to execute said detection of the atmospheric pressure only initially and when the engine is operated under said predetermined operating condition after a predetermined period of time has elapsed since the previous detection of the atmospheric pressure; and calculating the relative pneumatic pressure in the intake passage downstream of the throttle valve from said detected absolute pneumatic pressure in the intake passage and from said atmospheric pressure.

4. A method as claimed in claim 3, wherein said detection of the atmospheric pressure initially occurs when the engine is started.

5. An apparatus for detecting pneumatic pressure in an internal combustion engine having an intake passage, a throttle valve disposed on the intake passage, and a pressure detection port open to the intake passage at a position located downstream of the throttle valve, said apparatus comprising:

a single absolute pressure sensor for detecting the absolute pneumatic pressure of a fluid applied thereto;

means for selectively communicating said absolute pressure sensor to said pressure detection port of the intake passage or to the open air so as to detect the absolute pneumatic pressure in the intake passage downstream of the throttle valve and the atmospheric pressure, said absolute pressure sensor being communicated with the open air only initially and when the engine is operated under a predetermined operating condition, where the difference between the detected absolute pneumatic pressure and the detected atmospheric pressure is less than a predetermined value, after a predetermined period of time has elapsed since the previous detection of the atmospheric pressure; and means for calculating the relative pneumatic pressure in the intake passage downstream of the throttle valve from said detected absolute pneumatic pressure in the intake passage and from said atmospheric pressure.

6. An apparatus as claimed in claim 5, wherein said absolute pressure sensor initially communicates with the open air when the engine is started.

7. An apparatus for detecting pneumatic pressure in an internal combustion engine having an intake passage, a throttle valve disposed on the intake passage, and a pressure detection port open to the intake passage at a position located downstream of the throttle valve, said apparatus comprising:

a single absolute pressure sensor for detecting the absolute pneumatic pressure of a fluid applied thereto;

means for selectively communicating said absolute pressure sensor to said pressure detection port of the intake passage or to the open air so as to detect the absolute pneumatic pressure in the intake passage downstream of the throttle valve and the atmospheric pressure;

means for storing the detected absolute pneumatic pressure and the detected atmospheric pressure;

means for discriminating, in response to the stored absolute pneumatic pressure and stored atmospheric pressure, whether or not the engine is operated under a predetermined operating condition where the difference between the stored absolute pneumatic pressure and the stored atmospheric pressure is less than a predetermined value, in order to control said communicating means so that said absolute pressure sensor is communicated with the open air only initially and when the engine is operated under said predetermined operating condition after a predetermined period of time has elapsed since the previous communication with the open air; and means for calculating the relative pneumatic pressure in the intake passage downstream of the throttle valve from said detected absolute pneumatic pressure in the intake passage and from said atmospheric pressure.

8. An apparatus as claimed in claim 7, wherein said absolute pressure sensor initially communicates with the open air when the engine is started.

* * * * *